United States Patent [19]
Puhak

[11] 4,080,631
[45] Mar. 21, 1978

[54] SUPPORTIVE MEANS FOR A CATHODE RAY TUBE

[75] Inventor: Peter G. Puhak, Seneca Falls, N.Y.

[73] Assignee: GTE Sylvania Incorporated, Stamford, Conn.

[21] Appl. No.: 762,006

[22] Filed: Jan. 24, 1977

[51] Int. Cl.² ............................................. H04N 5/645
[52] U.S. Cl. ..................................................... 358/248
[58] Field of Search ............... 358/246, 245, 248, 249; 220/2.1 A, 2.3 A

[56] References Cited
U.S. PATENT DOCUMENTS

| | | | |
|---|---|---|---|
| 3,369,074 | 2/1968 | Massa | 358/245 |
| 3,651,257 | 3/1972 | Goetz | 358/248 |

FOREIGN PATENT DOCUMENTS 1,214,431  11/1966  United Kingdom ................ 358/246

*Primary Examiner*—Robert L. Griffin
*Assistant Examiner*—Edward L. Coles
*Attorney, Agent, or Firm*—Norman J. O'Malley; Frederick H. Rinn; Robert T. Orner

[57] ABSTRACT

Improved bracket means for supporting a cathode ray tube in a display enclosure. The improvement resides in the formation of the seating portion of the bracket which enables the implosion-inhibiting tensioned banding surrounding the tube to make substantially constant uninterrupted contact with the periphery of the tube.

9 Claims, 4 Drawing Figures

SUPPORTIVE MEANS FOR A CATHODE RAY TUBE

BACKGROUND OF THE INVENTION

This invention relates to cathode ray tubes and more particularly to improved supportive means for an implosion-resistant CRT.

Many cathode ray tubes, especially those utilized in television and other display applications, employ implosion resistant means in the form of a tensioned metallic band oriented in an encompassing manner about the envelope adjacent to the viewing area thereof. Certain tubes of this construction also employ bracket means associated with the peripheral banding to effect support for the cathode ray tube in a display enclosure. Such bracket means are conventionally formed as substantially L-shaped configurations having a seating segment and an integrally associated ear portion which affords means for attachment to the display enclosure. It has been conventional practice to fabricate such supportive bracket means of metal, such as cold rolled steel, wherein the seating segment is formed as a substantially flat metallic member having square shouldered sides evidencing substantially sharp corners. Since the seating segments of these brackets are normally sandwiched between the tensioned metallic implosion-inhibiting band and the side of the tube envelope, the tensioned banding naturally overlays the sharp corners of the seating segments. There have been instances when these substantially sharp corners constitute a frictional drag on the banding as it is tightened or tensioned around the periphery of the tube. As a result of such contact, the tensioned banding tends to form minute edge-related ridges in the band at each of the several bracket means. Such ridgings introduce deterrents to the uniformity of tensioning thereabout both initially and subsequently during temperature fluctuations of the tube. Additionally, the square-shouldered sides of the seating segments induce side-related spacings between the banding and the surface of the tube in the areas adjacent the edges of the segments thereby disturbing the desired continuous contact between the banding and the periphery of the tube.

OBJECTS AND SUMMARY OF THE INVENTION

It is an object of the invention to reduce and obviate the aforementioned disadvantages as evidenced in the prior art.

Another object of the invention is to provide an improvement in the bracket means for supporting a cathode ray tube in a display enclosure wherein the supportive means expedites uniformity of tensioning and provides substantially continuous contact of the implosion resistant band encompassing the tube.

A further object of the invention is to provide improved braket means for supporting a CRT in a display enclosure whereof the bracket is formed in a manner lending itself to expeditious manufacturing procedures.

DESCRIPTION OF THE PREFERRED EMBODIMENT

For a better umderstanding of the present invention, together with other and further objects, advantages and capabilities thereof, reference is made to the following specification and appended claims in connection with the aforedescribed drawings.

While the invention is illustrated as being formed for employment with a substantially rectangular cathode ray tube, the teachings of the disclosure are intended to be equally applicable to utilization with other tube envelope shapings such as round or ovate configurations.

Figure 1:
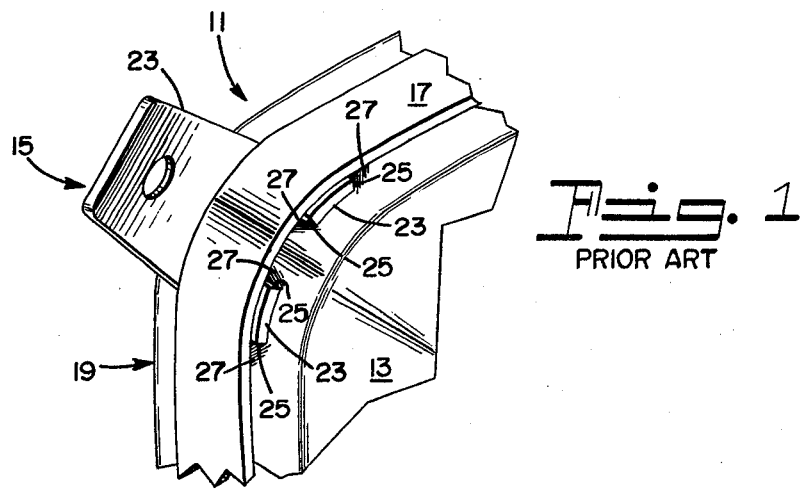
FIG. 1 is a fragmented perspective of the forward portion of a cathode ray tube illustrating prior art bracket means positioned under the tensioned metallic banding means peripherally encompassing the forward area of the tube adjacent the viewing area thereof.

In reference to FIG. 1, a fragmented region of the forward area of a cathode ray tube 11 is shown in a view looking forward from the funnel portion 13 of the tube, wherein a conventional bracket means 15 for supporting the tube in a display enclosure is oriented in conjunction with a tensioned implosion-inhibiting metallic band 17. Such banding is peripherally positioned as a tensioned encompassment of the forward area of the tube 11 at a side-related region adjacent the viewing region 19 thereof. The conventional bracket means 15 is normally formed of metal and shaped as a substantially L-configuration having an outstanding ear segment 23 integrally joined in angled relationship with at least one seating segment 23. As shown, two seating segments are utilized in a sandwiched manner between the tensioned metallic banding 17 and the forward side-related portion of the tube. It is to be noted that each of the seating segments 23 are conventionally formed to have substantially square-shouldered sides 25 evidencing substantially sharp or cut off edges. The seating segments so formed tend to space the tensioned metallic banding 17 from contact with the side of the tube forming gaps in the regions 29 immediately adjacent the squared seating segments 25. Additionally, it has been found in some instances, that the substantially square-shouldered edges of the seating segments evidence a sharpness tending to form a frictional drag against the metallic banding thereby inhibiting even or uniform tensioning thereof.

Figure 2:
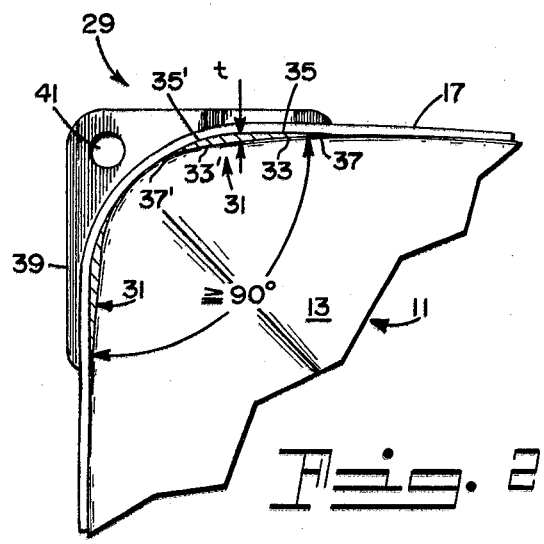
FIGS. 2 and 3 are plan views of bracket means incorporating the improvement of the invention, such being shown in subsequent association with a similar portion of the cathode ray tube as illustrated in FIG. 1.
Figure 4:
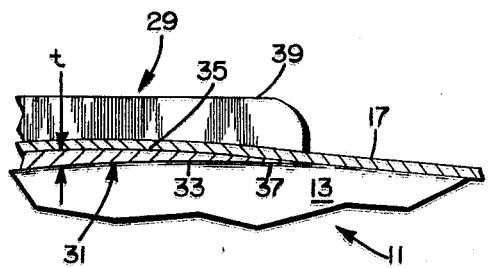
FIG. 4 is an enlarged partial section of the bracket means further detailing the improvements of the invention and their subsequent utilization.

The improved bracket means 29 of the inventions illustrated in FIG. 2, shows a formed structure having at least one pedate seating segment 31 formed of substantially rigid material and fashioned to conform to a discrete area of the peripheral surface of the tube whereupon it is subsequently employed as illustrated. This enables selective continuous placement of the seating segment between the metallic banding 17 and the peripheral side surface of the front of the tube 11. As also shown in FIG. 4, the seating segment 31 has a nominal thickness "$t$" from which side-related vergent regions 33 and 33' of decreasing thickness are formed transverse to the subsequent orientation of the banding means 17. These vergent regions are formed as defined ramps or slopes 35 and 35' each having a substantially feathered transverse terminal edge 37 and 37' from which the thickness of the pedate material gradually increases to the average or nominal thickness "$t$" of the segment 31. Integrally joined to the seating segment 31 and extending therefrom in a manner substantially normal to the region of integration, is an outstanding ear segment 39 having at least one aperture 41 therein to accommodate means for facilitating subsequent attachment of the bracket to the display enclosure, not shown.

Bracket means 29 illustrated in FIG. 2 is formed to have two spatially related seating segments 31 which are separately integrated to the ear segment 39 and oriented in at least 90 degrees relationship. The slopes or ramp-like vergent regions 35 and 35' of the respective seating segments enable the tensioned metallic banding means 17 to snugly conform to the peripheral region of the tube 11. The absence of any sharp or angular edges on the seating segments of the brackets facilitates uniform tensioning and substantially constant contact of the banding with the tube. Additionally, the improved formation of the seating segments insures positive positioning on the periphery of the tube.

Figure 3:
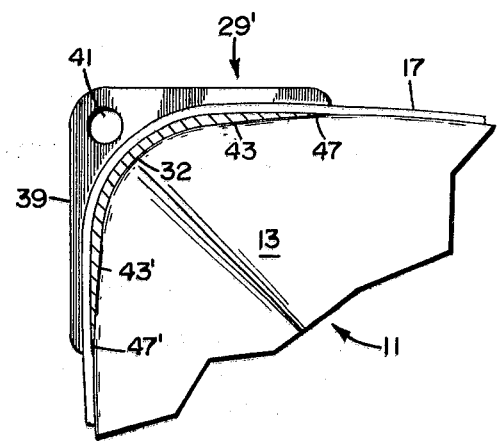

Another embodiment of the invention is illustrated in FIG. 3 wherein the pedate seating segment 32 of the bracket means 29' is formed as a substantially arcuate member and shaped to substantially match the contour of a discrete area of the tube 11. The vergent side-related regions 43 and 43' at either end thereof define ramp-like slopes terminating in feathered transverse edges 47 and 47', such being similar to those already described.

As mentioned, the relationship of the formation of the respective ramps to that of the subsequently applied banding 17 is further illustrated in FIG. 4. It is to be noted that the slope of the ramp 35 of the seating segment 31 is of a gradient not exceeding that of the natural lay of the banding 17 which is subsequently applied thereupon. The ensuing relationship jtherebetween is a smooth, even gradient free of bumps and abrupt ridges. This construction enables the tensioned implosion-inhibiting banding 17 to maintain substantially constant contact with both the bracket means and the periphery of the tube. by this means, uninterrupted contact tensioning is applied to the complete periphery of the tube.

It has been found that the improved bracket means of the invention can be expeditiously fabricated of suitable plastic material, such as, for example, a thermoplastic material incorporating glass or metallic reinforcing fibers. Examples of suitable materials are polyester and polycarbonate compositions. In those instances wherein a grounding electrical connection is made to the supportive bracket means, the bracket is coated with a durable electrical conductive material by means conventional to the art.

The improved bracket configuration also readily lends itself to being expeditiously formed of powdered metal material by conventional techniques utilizing molds and sized pressings. Such powdered material may be, for example, a ferrous composition.

Thus, there is provided an improvement in the bracket means for supporting a cathode ray tube in a display enclosure wherein the enhanced seating segments of the bracket promote uninterrupted contact and improved uniformity of tensioning of the implosion-inhibiting metallic banding surrounding the tube. The absense of sharp edges or angular contact between the metallic banding and the supportive brackets enhances the function of the banding thereby providing improved implosion protection.

While there has been shown and described what are at present considered the preferred embodiments of the invention, it will be obvious to those skilled in the art that various changes and modifications may be made therein without departing from the scope of the invention as defined by the appended claims.

What is claimed is:

1. An improvement in bracket means for supporting a cathode ray tube in a display enclosure, said tube being of the type having implosion inhibiting metallic banding means peripherally oriented as a tensioned encompassement of a forward area of said tube at a side-related region adjacent the viewing area thereof, said bracket means comprising:
    at least one pedate seating segment formed of substantially rigid material fashioned to conform to a discrete area of the peripheral surface of said tube for selective continuous placement between said band and the peripheral side surface of said tube, said pedate segment having side-related vergent regions transverse to the orientation of said banding means, at least one of said vergent regions being formed as a defined ramp having a substantially feathered terminal transverse edge from which the thickness of the pedate material gradually increases to the nominal thickness of the segment; and
    an ear segment integrally joined to said seating segment and formed of substantially like material in a manner substantially normal to the region of integration, said segment having at least one aperture therein to accommodate means for facilitating subsequent attachment of said bracket to said display enclosure.

2. The improved bracket means according to claim 1 wherein the pedate segment of said bracket means is formed of two spatially related seating portions oriented in at least 90° relationship, each being separately integrated with said ear portion.

3. The improved bracket means according to claim 1 wherein the pedate segment of said bracket means is formed as an arcuate member to substantially match the contour of a discrete area of said tube.

4. The improved bracket means according to claim 1 wherein said fabrication material is a powdered metal composition.

5. The improved bracket means according to claim 4 wherein said fabrication material is a ferrous composition.

6. The improved bracket means according to claim 1 wherein the slope of said ramp is of a gradient not exceeding that of the natural lay of said banding subsequently applied thereupon.

7. The improved bracket means according to claim 1 wherein said bracket means is fabricated of plastic material.

8. The improved bracket means according to claim 7 wherein said plastic fabrication is of a thermoplastic material including reinforcing fibers.

9. The improved bracket means according to claim 7 wherein at least a portion of the exterior surface of said bracket is coated with a durable electrical conductive material.

* * * * *

UNITED STATES PATENT OFFICE
CERTIFICATE OF CORRECTION

Patent No. 4,080,631  Dated  March 21, 1978

Inventor(s)  Peter G. Puhak

It is certified that error appears in the above-identified patent and that said Letters Patent are hereby corrected as shown below:

Column 3, line 34, "jtherebetween" should read -- therebetween --.

Column 3, line 40, "by" should read -- By --.

Signed and Sealed this

Fifth Day of September 1978

[SEAL]

Attest:

RUTH C. MASON
*Attesting Officer*

DONALD W. BANNER
*Commissioner of Patents and Trademarks*